(12) United States Patent
Lupia et al.

(10) Patent No.: US 7,765,430 B2
(45) Date of Patent: Jul. 27, 2010

(54) DEVICE AND METHOD TO ENHANCE AVAILABILITY OF CLUSTER-BASED PROCESSING SYSTEMS

(75) Inventors: David J. Lupia, Oldsmar, FL (US); Jeremy Ramos, Tampa, FL (US); John R. Samson, Jr., Palm Harbor, FL (US)

(73) Assignee: Honeywell International Inc., Morristown, NJ (US)

( * ) Notice: Subject to any disclaimer, the term of this patent is extended or adjusted under 35 U.S.C. 154(b) by 1002 days.

(21) Appl. No.: 11/459,561

(22) Filed: Jul. 24, 2006

(65) Prior Publication Data

US 2008/0022152 A1 Jan. 24, 2008

(51) Int. Cl.
*G06F 11/00* (2006.01)
(52) U.S. Cl. .............. 714/18; 714/16; 714/21; 714/23
(58) Field of Classification Search ............ 714/16, 714/18, 21, 23
See application file for complete search history.

(56) References Cited

U.S. PATENT DOCUMENTS

| 6,345,331 | B1* | 2/2002 | Fuente ................ 710/72 |
| 7,137,020 | B2* | 11/2006 | Gilstrap et al. ........... 713/324 |
| 2003/0061535 | A1* | 3/2003 | Bickel .................. 714/11 |
| 2003/0061537 | A1* | 3/2003 | Cha et al. ............. 714/16 |
| 2006/0036909 | A1* | 2/2006 | VanBuren ............. 714/15 |

OTHER PUBLICATIONS

European Patent Office, "European Search Report", Mar. 2, 2009, Published in: EP.

* cited by examiner

*Primary Examiner*—Joshua A Lohn
(74) *Attorney, Agent, or Firm*—Fogg & Powers LLC

(57) ABSTRACT

An electronic computing device including at least one processing unit that implements a specific fault signal upon experiencing an associated fault, a control unit that generates a specific recovery signal upon receiving the fault signal from the at least one processing unit, and at least one input memory unit. The recovery signal initiates specific recovery processes in the at least one processing unit. The input memory buffers input data signals input to the at least one processing unit that experienced the fault during the recovery period.

18 Claims, 4 Drawing Sheets

DEVICE AND METHOD TO ENHANCE AVAILABILITY OF CLUSTER-BASED PROCESSING SYSTEMS

GOVERNMENT LICENSE RIGHTS

The U.S. Government may have certain rights in the present invention as provided for by the terms of Government Contract # NMO710209 with NASA.

BACKGROUND

Computers in spacecraft that fly at high altitudes, that orbit the earth, or that travel in outerspace are subject to harsh radiation. In order to mitigate the effect of radiation on electronics within the airborne computers, redundant processors are used and processing components in the computer are radiation hardened. Radiation hardened processors are expensive with respect to commercial-off-the-shelf (COTS) components. One method to implement COTS components in airborne computers is described in the patent application Honeywell Docket No. H0007127-1628 entitled "METHOD AND SYSTEM FOR ENVIRONMENTALLY ADAPTIVE FAULT TOLERANT COMPUTING" and filed on Nov. 21, 2005, which is hereby incorporated in full.

It is desirable to use COTS processing components in harsh environments without loss of capability or loss of critical data due to single event upsets (SEU) when the non-radiation hardened processor is impacted by high energy radiation or by a high energy particle.

SUMMARY

An electronic computing device including at least one processing unit that implements a specific fault signal upon experiencing an associated fault, a control unit that generates a specific recovery signal upon receiving the fault signal from the at least one processing unit, and at least one input memory unit. The recovery signal initiates specific recovery processes in the at least one processing unit. The input memory buffers input data signals input to the at least one processing unit that experienced the fault during the recovery period.

DRAWINGS

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Figure 1:
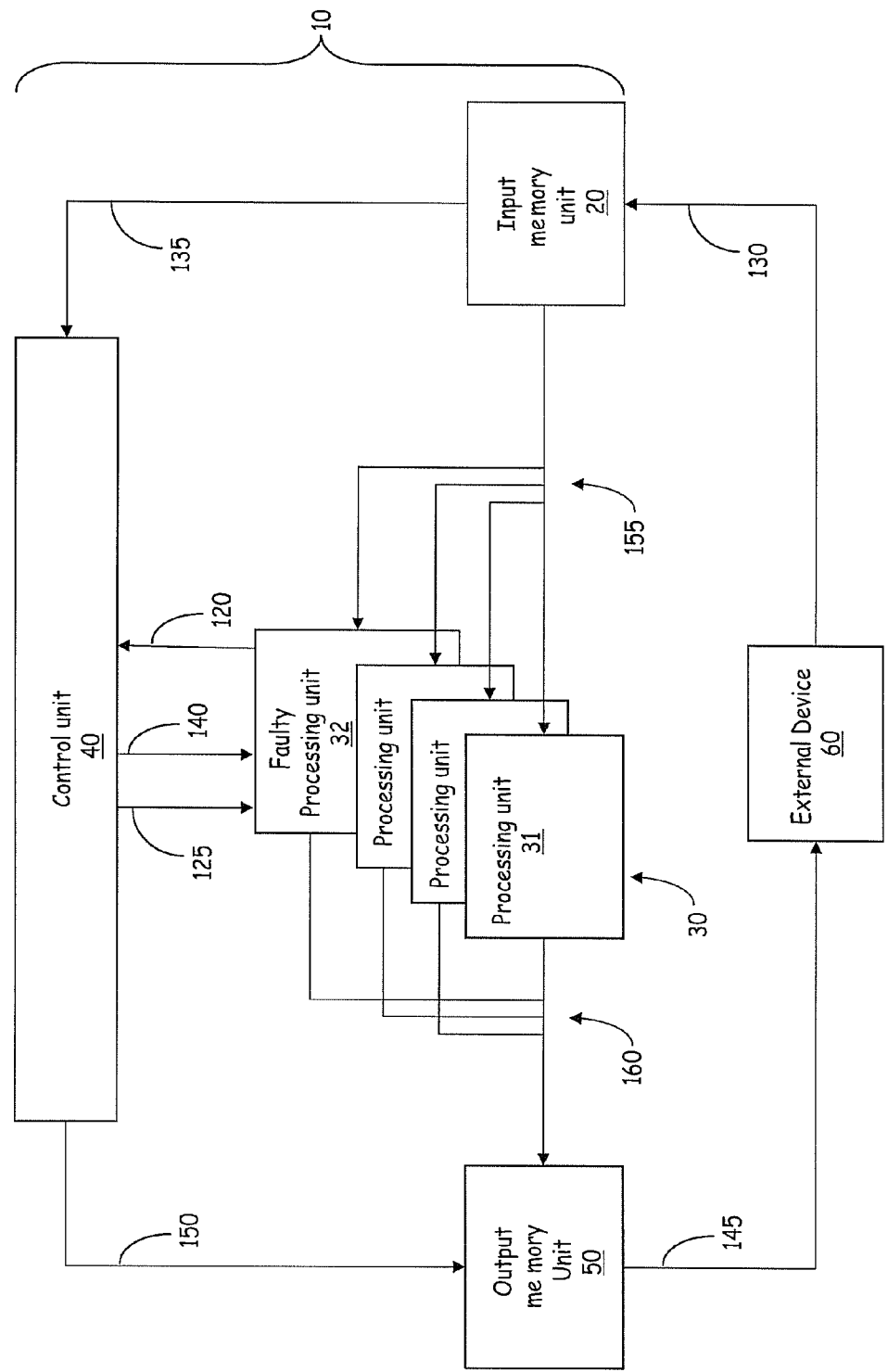
FIG. 1 is a block diagram of one embodiment of an electronic computing device in accordance with the present invention.

FIG. 1 is a block diagram of one embodiment of an electronic computing device 10 in accordance with the present invention. The electronic computing device 10 repairs damage to the plurality of processing units represented generally by the numeral 30 in the electronic computing device 10 without any loss of data that is being input or output to the electronic computing device 10. The electronic computing device 10 includes at least one processing unit 30, a control unit 40, an input memory unit 20, and an output memory unit 50. In one implementation of this embodiment, the control unit 40, the input memory unit 20, and the output memory unit 50 are fault tolerant. For example, if the electronic computing device 10 is in an airborne vehicle that is subjected to radiation, the control unit 40, the input memory unit 20, and the output memory unit 50 are radiation hardened. The processing units 30 comprise a cluster-based processing system 30, which is not fault tolerant. This makes the electronic computing device 10 less expensive than an electronic computing device, which includes fault tolerant processing units 30. In one implementation of this embodiment, the processing units 30 are COTS components. Fault tolerant input memory units 20 and output memory units 40 are relatively inexpensive with respect to fault tolerant processing unit 30.

The electronic computing device 10 includes at least one processing unit 30 that implements a specific fault signal upon experiencing an associated fault. The specific fault signal is also referred to herein as a fault signal. As shown in FIG. 1, the at least one processing unit 30 includes processing unit 31 and an exemplary faulty processing unit 32 that has been damaged by the environment. When the faulty processing unit 32 is damaged, the faulty processing unit 32 sends a specific fault signal via communication link 120 to the control unit 40. The control unit 40 generates a specific recovery signal upon receiving the specific fault signal from the at least one processing unit, such as faulty processing unit 32.

The control unit 40 outputs the specific recovery signal via communication link 125 to the faulty processing unit 32. The control unit 40 also outputs a nominal processing rate signal via communication link 140 to the faulty processing unit 32 to initiate the specific recovery process at a nominal processing rate. In one implementation of this embodiment, the communication link 140 and the communication link 125 are the same communication link.

The specific recovery signal received at the faulty processing unit 32 initiates a specific recovery process in the faulty processing unit 32. The type of specific recovery process is a function of the specific recovery signal that is sent. In one implementation of this embodiment, the recovery process is a reboot of the faulty processing unit 32. In another implementation of this embodiment, the recovery process is a power cycle of the faulty processing unit 31. Other recovery processes are possible.

The input memory unit 20 buffers input data signals that are input to the electronic computing device 10 via communication link 130 for the processing units 30 including the faulty processing unit 32 from an external system or device, such as the external device 60 shown in FIG. 1. After temporary storage implemented as needed, the input memory unit 20 outputs processing unit input data signals to each of the processing units 30 via communication links represented generally by the numeral 155. Each of the processing units 30 output processing unit output data signals to the output memory unit 50 via communication links represented generally by the numeral 160.

The input memory unit 20 buffers input data signals during the recovery period in which the faulty processing unit 32 is repairing itself in response to the received specific recovery signal. If the data to be buffered exceeds the input memory unit's memory capability or is close to exceeding the input memory unit's memory capability, the input memory unit 20 outputs a threshold signal via communication link 135 when the buffered system input data signals exceed a selected threshold. The control unit 40 receives the threshold signal and increases a nominal processing rate for the recovery process by a rate coefficient factor responsive to the received threshold signal. The increased processing rate is defined herein as a recovery processing rate. The control unit 40 outputs a rate signal via communication link 140 to the faulty processing unit 32 to increase the nominal processing rate to a recovery processing rate.

In one implementation of this embodiment, the rate coefficient factor is a selected rate coefficient factor that is stored in the control unit 40. In another implementation of this embodiment, the amount of data (in bits) that exceeds the selected threshold is an input memory size so that the selected threshold is the number of bits capable of being stored in the input memory unit 20. In this case, the rate coefficient factor is greater than the input memory size divided by the product of the mean time between faults and the nominal processing rate. In one implementation of this embodiment, the control unit 40 generates the mean time between faults based on the recent fault statistics for the electronic computing device 10. In another implementation of this embodiment, that the selected threshold is a percentage less than 100% of the memory capability of the input memory unit 20. In an exemplary case, the selected threshold is 95% of the memory capability of the input memory unit 20. In yet another implementation of this embodiment, the selected threshold is zero and the control unit initiates the recovery process at the recovery processing rate that is greater than the nominal processing rate by a rate coefficient factor at the start of the recovery process.

The output memory unit 50 buffers processing unit output data signals and sends system output data signals via communication link 145 to the external system, such as the exemplary external device 60 shown in FIG. 1. When the control unit 40 receives the fault signal, the control unit 40 outputs a flush signal via communication link 150 to the output memory unit 50. When the output memory unit 50 receives the flush signal from the control unit 40, the output memory unit 50 deletes the processing unit output data signals that are in the output memory unit. In this manner, faulty data is not output to the external device. Rather it is deleted (flushed) from the output memory device making room for correct data to be recalculated.

Communication links 120, 125, 135, 140, 150, 155 and 160 comprise conductive traces and/or or wires such as copper wire. Communication links 130 and 145 comprise one or more of a wireless communication link (for example, a radio-frequency (RF) communication link), a wired communication link (for example, an optical fiber or copper wire communication link), and/or conductive traces.

In one implementation of this embodiment, the external device 60 is a computer co-located with the electronic computing device 10 in an environment that experiences a high level of radiation, such as gamma rays, high-energy particles and/or UV radiation. In another implementation of this embodiment, the external device 60 is a control system that controls a plurality of electronic computing devices 10 from a location remote from the electronic computing devices 10.

Figure 2:
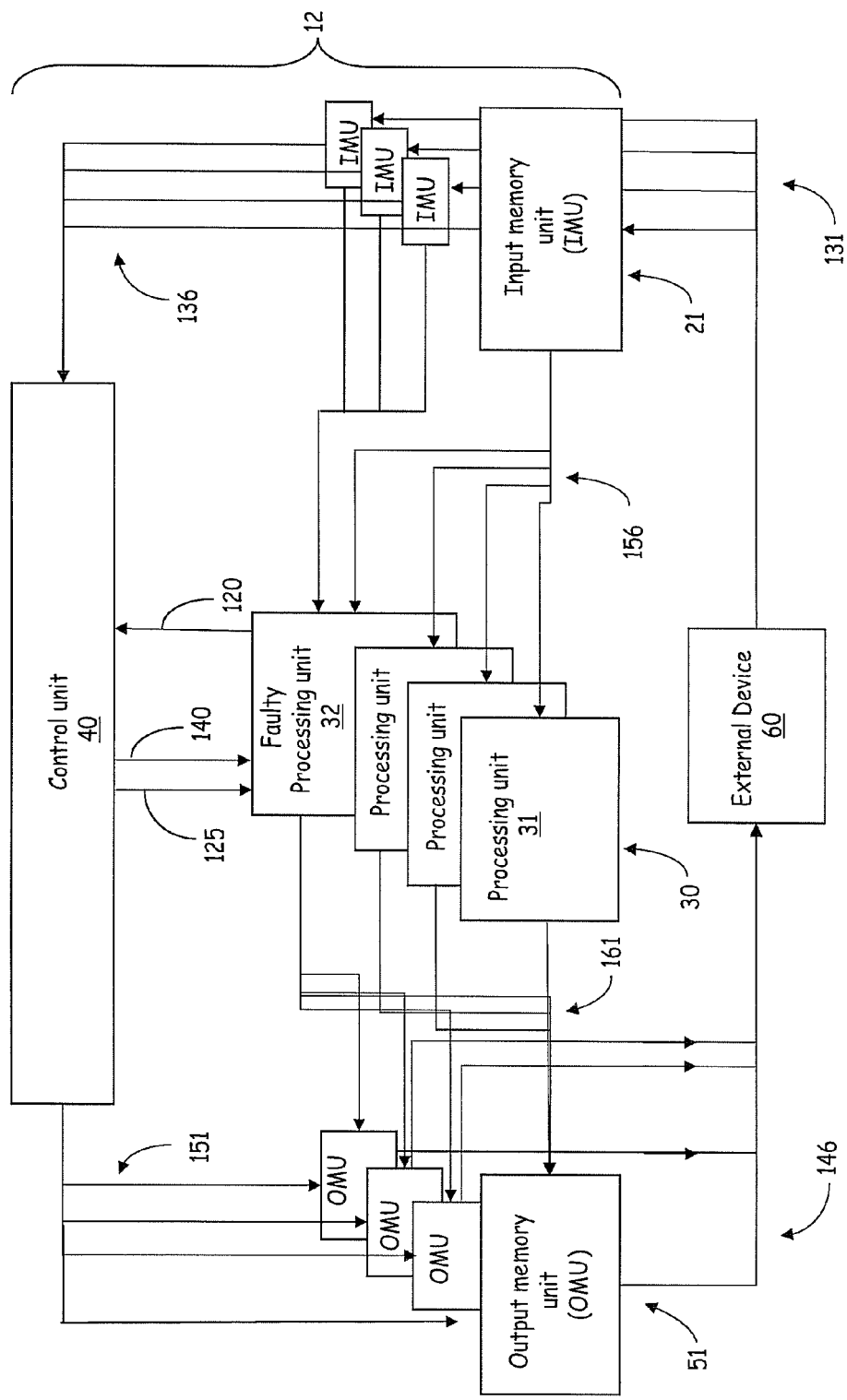
FIG. 2 is a block diagram of one embodiment of an electronic computing device in accordance with the present invention.

As shown in FIG. 1, the input memory unit is a single input memory unit, and the output memory unit is a single output memory unit. FIG. 2 is a block diagram of one embodiment of an electronic computing device 12 in accordance with the present invention. The electronic computing device 12 includes at least one processing unit 30, a control unit 40, a plurality of input memory units represented generally by the numeral 21, and a plurality of output memory units represented generally by the numeral 51. The control unit 40, the plurality of input memory units 20, and the plurality of output memory units 50 are fault tolerant so the mean time between faults for the control unit 40, the plurality of input memory units 20, and the plurality of output memory units 50 is much greater than the mean time between faults for the processing units. The control unit 40 receives threshold signals via communication links represented generally by the numeral 136 from each of the plurality of input memory units 21 as required and sends flush signals via communication links 151 to each of the plurality of output memory units 51 as required.

Each of the plurality of input memory units 21 outputs processing unit input data signals via communication link represented generally by the numeral 156 to each of the processing units 30. Each of the processing units 30 output processing unit output data signals via communication link represented generally by the numeral 161 to each of the output memory units 51. Each of the plurality of input memory units 21 receives system input data signals from the external device 60 via communication links generally represented by numeral 131. Each of the plurality of output memory units 51 output system output data signals to the external device 60 via communication links generally represented by numeral 146. Communication links 136, 151, 156, and 161 comprise conductive traces and/or or wires such as copper wire. Communication links 131 and 146 comprise one or more of a wireless communication link (for example, a radio-frequency (RF) communication link), a wired communication link (for example, an optical fiber or copper wire communication link), and/or conductive traces.

Figure 3:
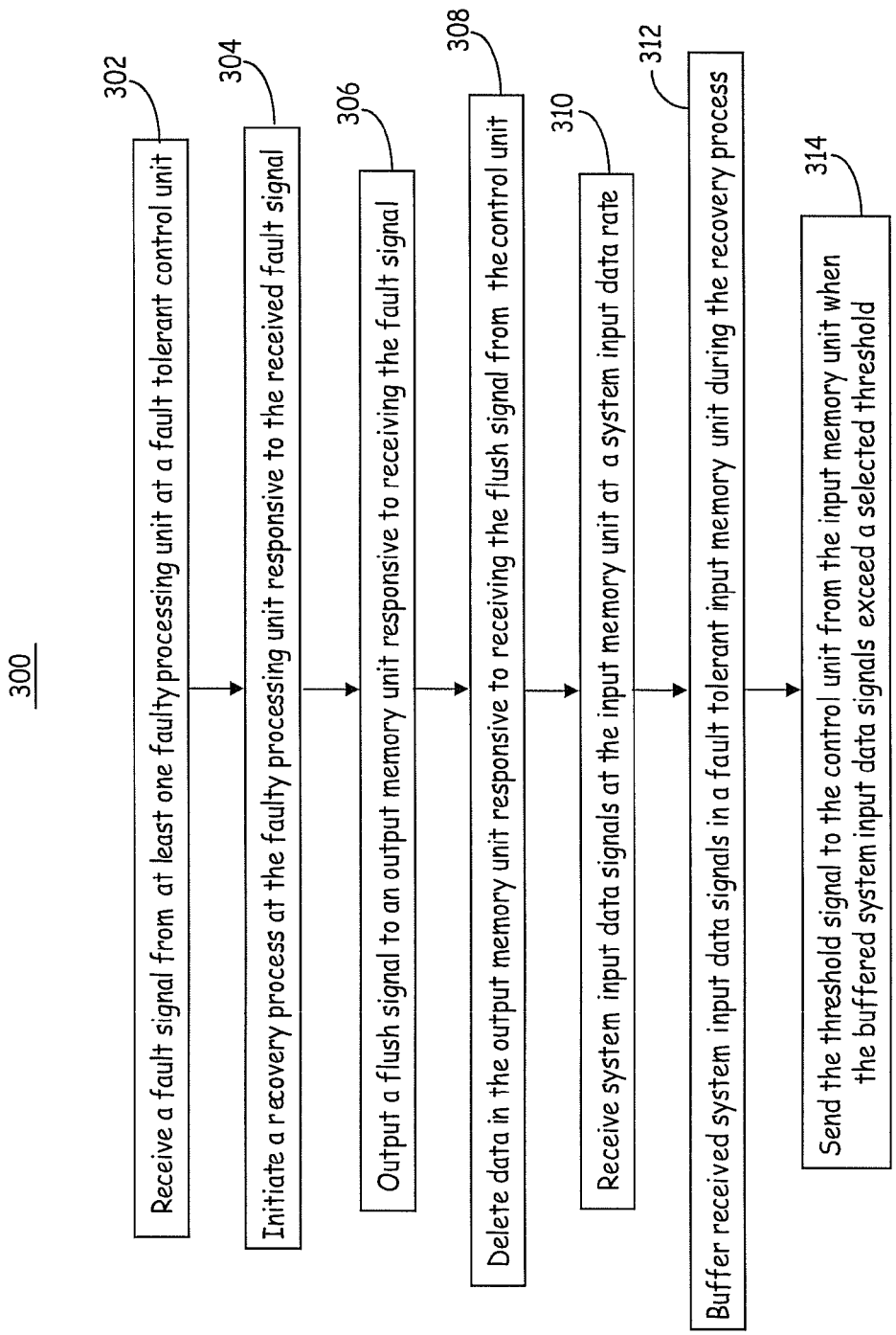
FIG. 3 is a flow diagram of one embodiment of a method to enhance availability of cluster-based processing systems in accordance with the present invention.

FIG. 3 is a flow diagram of one embodiment of a method 300 to enhance availability of cluster-based processing systems in accordance with the present invention. Method 300 is described with reference to the electronic computing device 10 of FIG. 1 although the method is applicable to the electronic computing device 12 of FIG. 2 and other electronic computing devices.

At block 302, a fault tolerant control unit receives a specific fault signal from at least one faulty processing unit. In one implementation of this embodiment, the fault tolerant control unit 40 of electronic computing device 10 receives a specific fault signal via communication link 120 from faulty processing unit 32. At block 304, the control unit initiates a recovery process at the faulty processing unit responsive to the received fault signal. In one implementation of this embodiment, the control unit 40 initiates the recovery process by sending a specific recovery signal via communication link 125 and a nominal processing rate signal via communication link 140 to the faulty processing unit 32 responsive to the received fault signal. In another implementation of this embodiment, the control unit 40 initiates the recovery process by sending a specific recovery signal via communication link 125 and a recovery processing rate signal via communication link 140 to the faulty processing unit responsive to the received fault signal to initiate the recovery at a recovery processing rate that exceeds the nominal processing rate.

At block 306, the control unit outputs a flush signal to an output memory unit responsive to receiving the fault signal. In one implementation of this embodiment, the control unit 40 outputs a flush signal via communication link 150 to an output memory unit 50 responsive to receiving the fault signal. At block 308, the output memory unit deletes data in the output memory unit responsive to receiving the flush signal from the control unit. In one implementation of this embodiment, the output memory unit 50 deletes data currently within the output memory unit 50 responsive to receiving the flush signal from the control unit 40.

At block 310, the input memory unit receives system input data signals at the at a system input data rate. In one implementation of this embodiment, the input memory unit 20 receives system input data signals at the system input data rate from the external device 60 via communication link 130. At block 312, the input memory unit buffers the received system input data signals during the recovery process. In one implementation of this embodiment, the input memory unit 20 buffers the received system input data signals during the recovery process.

At block 314, the input memory unit sends a threshold signal to the control unit when the buffered system input data signals exceed a selected threshold. In one implementation of this embodiment, the input memory unit 20 sends a threshold signal to the control unit 40 when the buffered system input data signals exceed a selected threshold.

Figure 4:
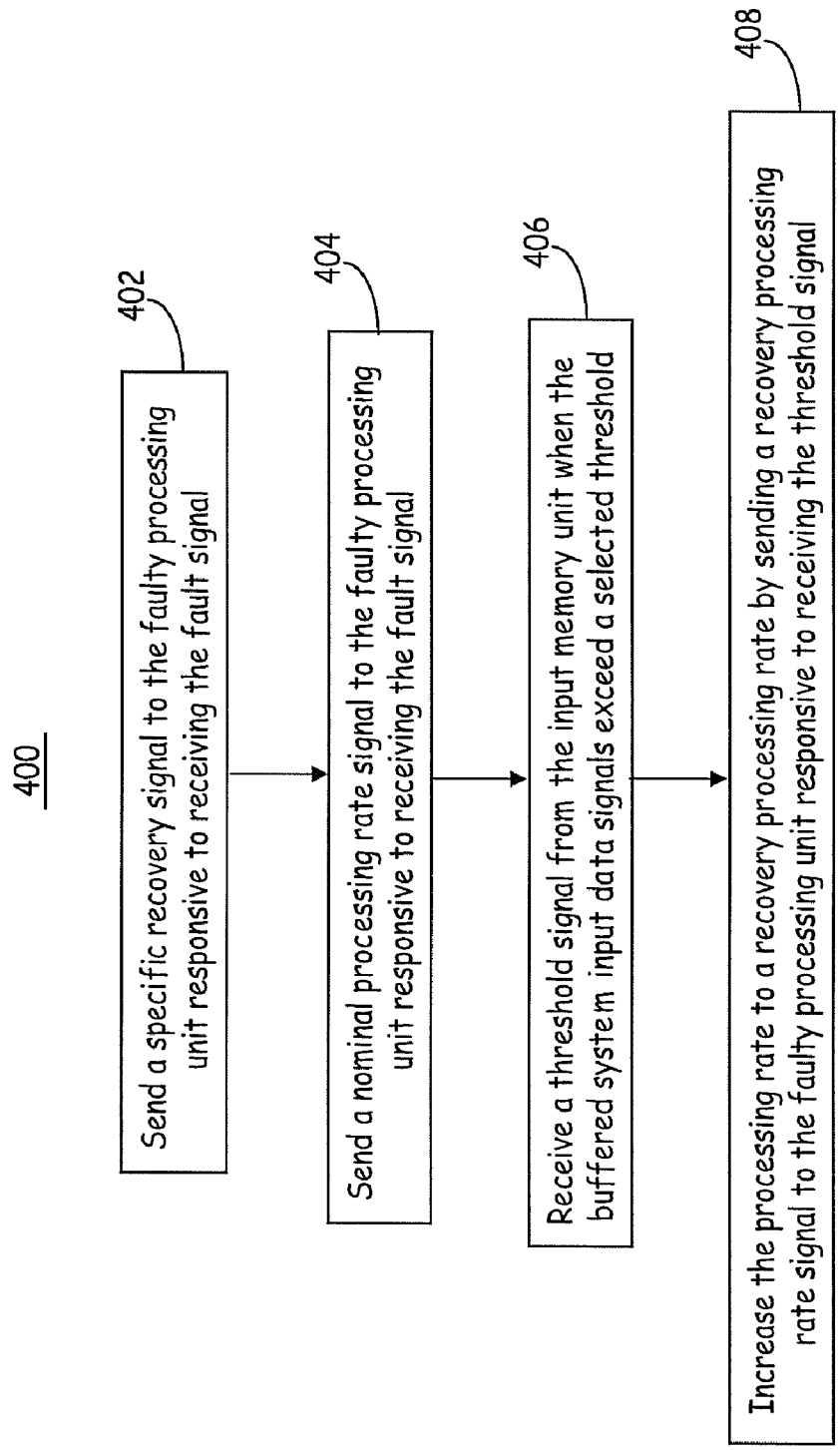
FIG. 4 is a flow diagram of one embodiment of a method to initiate a recovery process at a faulty processing unit in accordance with the present invention.

FIG. 4 is a flow diagram of one embodiment of a method 400 to initiate a recovery process at a faulty processing unit in accordance with the present invention. Method 400 is described with reference to the electronic computing device 10 of FIG. 1 although the method is applicable to the electronic computing device 12 of FIG. 2 and other electronic computing devices.

At block 402, the control unit sends a specific recovery signal to the faulty processing unit responsive to receiving the specific fault signal, to initiate the recovery process. In one implementation of this embodiment, the control unit 40 sends a specific recovery signal to the faulty processing unit 32 via communication link 125 responsive to receiving the fault signal from the faulty processing unit 32.

At block 404, the control unit sends a nominal processing rate signal to the faulty processing unit responsive to receiving the specific fault signal, to initiate the recovery process at a processing rate equal to a nominal processing rate. In one implementation of this embodiment, the control unit 40 sends a nominal processing rate signal to the faulty processing unit 32 via communication link 140 responsive to receiving the specific fault signal and the recovery process for the faulty processing unit 32 is initiated at a processing rate equal to a nominal processing rate.

At block 406, the control unit receives a threshold signal from the input memory unit when the buffered system input data signals exceed a selected threshold. In one implementation of this embodiment, the control unit 40 receives a threshold signal from the input memory unit 20 when the buffered system input data signals being stored in the input memory unit 20 exceed a selected threshold.

At block 408, the control unit increases the processing rate to a recovery processing rate by sending a recovery processing rate signal to the faulty processing unit responsive to receiving the threshold signal. The recovery processing rate is greater than the product of the nominal processing rate and the rate coefficient factor. In one implementation of this embodiment, the control unit 40 increases the processing rate to a recovery processing rate by sending a recovery processing rate signal via communication link 140 to the faulty processing unit 32 responsive to receiving the threshold signal from the input memory unit 20.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A system to enhance availability of processors in a cluster, the system comprising:
    means for receiving a specific fault signal from at least one faulty processing unit at a fault tolerant control unit;
    means for initiating a recovery process at the faulty processing unit at a processing rate equal to a first processing rate responsive to the received fault signal;
    means for buffering received system input data signals in a fault tolerant input memory unit during the recovery process;
    means for receiving a threshold signal from the input memory unit when the buffered system input data signals exceed a selected threshold; and
    means for increasing the processing rate of the recovery process to a recovery processing rate, wherein the recovery processing rate is greater than a product of the first processing rate and a rate coefficient factor.

2. The system of claim 1 further comprising:
    means for outputting a flush signal to an output memory unit responsive to receiving the fault signal.

3. The system of claim 2 further comprising:
    means for deleting data in the output memory unit responsive to receiving the flush signal from the control unit.

4. An electronic computing device comprising:
    at least one processing unit adapted to implement a specific fault signal upon experiencing an associated fault;
    a control unit adapted to generate a specific recovery signal upon receiving the fault signal from the at least one processing unit, the recovery signal initiating specific recovery processes in the at least one processing unit; and
    at least one input memory unit, the input memory adapted to buffer input data signals to the at least one processing unit that experienced the fault during the recovery period, wherein the control unit outputs a first processing rate signal to the at least one processing unit that experienced the fault in order to initiate the specific recovery process at a first processing rate, and wherein the input memory unit is further adapted to output a threshold signal when the buffered system input data signals exceed a selected threshold, and the control unit is further adapted to increase the first processing rate for the recovery process by a rate coefficient factor responsive to the received threshold signal.

5. The device of claim 4, wherein the amount of data that exceeds the selected threshold comprises an input memory size, and wherein the rate coefficient factor is greater than the input memory size divided by the product of the mean time between faults and the first processing rate.

6. The device of claim 4, the device further comprising:
    at least one output memory unit adapted to buffer processing unit output data signals and to send system output data signals to an external device, wherein the control unit is further adapted to output a flush signal to the output memory unit, and wherein the output memory unit is further adapted to receive the flush signal from the control unit and to delete the processing unit output data signals from the output memory unit responsive to the received flush signal.

7. The device of claim 6, wherein the at least one input memory unit comprises a single input memory unit, and the at least one output memory unit comprises a single output memory unit.

8. The device of claim 6, wherein the at least one input memory unit is a fault tolerant input memory unit, the control unit is a fault tolerant control unit, and the output memory unit is a fault tolerant output memory unit.

9. The device of claim 4, wherein the selected threshold is zero, and the control unit is further adapted to initiate the recovery process at a recovery processing rate that is greater than the first processing rate.

10. The device of claim 4, wherein the control unit is further adapted to initiate the recovery process at a recovery processing rate that is greater than the first processing rate.

11. A method to enhance availability of cluster-based processing systems, the method comprising:
   receiving a specific fault signal from at least one faulty processing unit at a fault tolerant control unit;
   sending a specific recovery signal to the faulty processing unit responsive to receiving the specific fault signal;
   sending a first processing rate signal to the faulty processing unit responsive to receiving the specific fault signal, wherein a recovery process is initiated at a first processing rate based on the sending of the specific recovery signal and the sending the first processing rate signal;
   buffering received system input data signals in a fault tolerant input memory unit during the recovery process;
   receiving a threshold signal from the input memory unit when the buffered system input data signals exceed a selected threshold; and
   increasing the processing rate from the first processing rate to a recovery processing rate, wherein the recovery processing rate is greater than the product of the first processing rate and a rate coefficient factor.

12. The method of claim 11, wherein increasing the processing rate comprises:
   sending a recovery processing rate signal to the faulty processing unit responsive to receiving the threshold signal.

13. The method of claim 11, the method further comprising:
   outputting a flush signal to an output memory unit responsive to receiving the fault signal.

14. The method of claim 13, the method further comprising:
   deleting data in the output memory unit responsive to receiving the flush signal from the control unit.

15. The method of claim 11, the method further comprising:
   receiving system input data signals at the input memory unit at a system input data rate; and
   sending the threshold signal to the control unit from the input memory unit when the buffered system input data signals exceed a selected threshold.

16. The method of claim 11, wherein the selected threshold is zero, and wherein the sending the first processing rate signal to the faulty processing unit comprises sending a recovery processing rate signal to the faulty processing unit responsive to the received fault signal.

17. The method of claim 16, the method further comprising:
   outputting a flush signal to an output memory unit responsive to receiving the fault signal.

18. The method of claim 17, the method further comprising:
   deleting data in the output memory unit responsive to receiving the flush signal from the control unit.

* * * * *